(12) United States Patent
Takizawa

(10) Patent No.: US 8,299,683 B2
(45) Date of Patent: Oct. 30, 2012

(54) ULTRASONIC MOTOR

(75) Inventor: Hiroyuki Takizawa, Chofu (JP)

(73) Assignee: Olympus Corporation, Tokyo (JP)

( * ) Notice: Subject to any disclaimer, the term of this patent is extended or adjusted under 35 U.S.C. 154(b) by 84 days.

(21) Appl. No.: 13/019,425

(22) Filed: Feb. 2, 2011

(65) Prior Publication Data

US 2011/0187230 A1 Aug. 4, 2011

(30) Foreign Application Priority Data

Feb. 2, 2010 (JP) ................................. 2010-021051

(51) Int. Cl.
*H01L 41/08* (2006.01)
(52) U.S. Cl. .......... 310/323.12; 310/323.02; 310/323.16
(58) Field of Classification Search ............. 310/323.02, 310/323.12, 323.16
See application file for complete search history.

(56) References Cited

U.S. PATENT DOCUMENTS

| | | | | |
|---|---|---|---|---|
| 5,345,137 A | * | 9/1994 | Funakubo et al. | 310/323.16 |
| 5,723,935 A | * | 3/1998 | Tomikawa et al. | 310/323.02 |
| 6,081,063 A | * | 6/2000 | Kasuga et al. | 310/323.02 |
| 6,352,332 B1 | * | 3/2002 | Walker | 347/19 |
| 6,469,419 B2 | * | 10/2002 | Kato et al. | 310/323.02 |
| 2010/0019621 A1 | * | 1/2010 | Funakubo et al. | 310/323.16 |

FOREIGN PATENT DOCUMENTS

JP H9-117168 5/1997

* cited by examiner

*Primary Examiner* — Mark Budd
(74) *Attorney, Agent, or Firm* — Scully, Scott, Murphy & Presser, P.C.

(57) ABSTRACT

In an ultrasonic motor, an elliptical vibration is generated by combining a longitudinal primary resonance vibration resulting from an expansion and a contraction of a vibrator in a direction of a central axis and a torsional secondary resonance vibration or a torsional tertiary resonance vibration resulting from twisting of a rotation axis. A dimension ratio of a rectangle of the vibrator is chosen such that a resonance frequency of the longitudinal primary resonance vibration and a resonance frequency of the torsional secondary resonance vibration or the torsional tertiary resonance vibration match. The vibrator includes a plurality of regions in a surface orthogonal to the central axis, and deformations of the regions adjacent to each other along the direction of the central axis are mutually different. The vibrator expands and contracts in a direction along a polarization direction thereof.

3 Claims, 16 Drawing Sheets

100

FIG.8A
FIG.8B
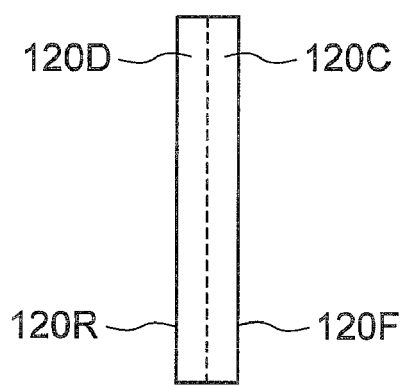
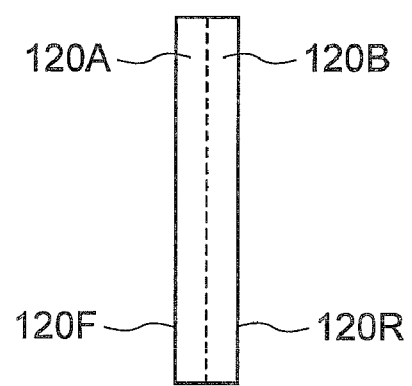

FIG.14A
FIG.14B
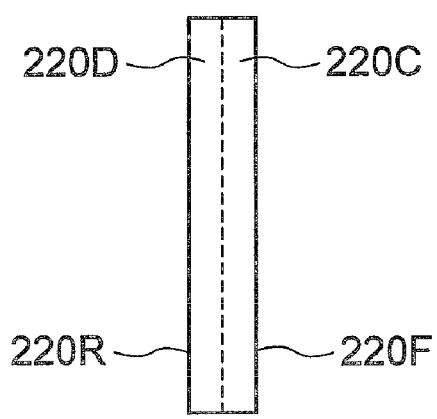
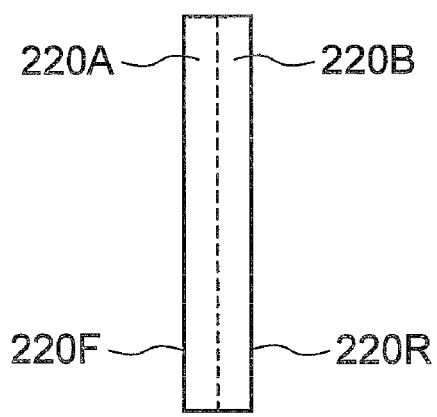

ULTRASONIC MOTOR

CROSS-REFERENCE TO RELATED APPLICATIONS

The present application is based upon and claims the benefit of priority from the prior Japanese Patent Application No. 2010-021051 filed on Feb. 2, 2010; the entire contents of which are incorporated herein by reference.

BACKGROUND OF THE INVENTION

1. Field of the Invention

The present invention relates to ultrasonic motors.

2. Description of the Related Art

Japanese Patent Application Laid-open No. H9-117168, for example, discloses an ultrasonic motor that generates an elliptical vibration by combining a longitudinal vibration and a torsional vibration, and rotation drives a rotor. FIG. 1 of Japanese Patent Application Laid-open No. H9-117168 depicts an exploded perspective view of a vibrator. The vibrator has a structure in which a plurality of piezoelectric elements is arranged between elastic bodies that are cut obliquely with respect to an axis of the vibrator. Positive electrodes of the piezoelectric elements are divided into two groups. These groups will be called Phase A and Phase B electrodes.

The longitudinal vibration can be generated in a bar-shaped vibrator by applying alternating voltages of the same phase to both Phase A and Phase B electrodes. On the other hand, the torsional vibration can be generated in the bar-shaped vibrator by applying alternating voltages of opposite phases to both Phase A and Phase B electrodes. A position of a groove in the vibrator is adjusted such that a resonance frequency of the longitudinal vibration and a resonance frequency of the torsional vibration substantially match. When alternating voltages that differ by $\pi/2$ phase are applied to Phase A and Phase B electrodes, the longitudinal vibration and the torsional vibration are generated simultaneously, thereby generating an elliptical vibration on a top surface of a bar-shaped elastic body. In this state, by pressing the rotor on the top surface of the bar-shaped elastic body, the rotor can be rotation driven in a clockwise direction (CW direction) or a counterclockwise direction (CCW direction).

The ultrasonic motor disclosed in Japanese Patent Application Laid-open No. H9-117168 has various drawbacks. For example, as shown in FIG. 1, both the piezoelectric element and the elastic body are necessary, the elastic body must be cut obliquely, and the groove must be made in a portion of the elastic body to match the resonance frequencies of the longitudinal vibration and the torsional vibration. Thus, the overall structure of the conventional vibrator is very complicated.

SUMMARY OF THE INVENTION

The present invention is made in view of the above discussion. It is an object of the present invention to provide an ultrasonic motor that can generate a torsional resonance vibration efficiently by positively employing the bending movement of the piezoelectric element. It is another object of the present invention to provide an ultrasonic motor that includes a single part, has a simple structure without a groove etc., can generate a longitudinal vibration and a torsional vibration easily, can generate an elliptical vibration by combining the longitudinal vibration and the torsional vibration, and can rotate a rotor by the elliptical vibration.

To solve the above problems and to achieve the above objects, according to an aspect of the present invention, an ultrasonic motor includes a vibrator having a dimension ratio of a rectangle in a cross-section orthogonal to a central axis; and a rotor that contacts an elliptical vibration generating surface of the vibrator and that is rotation driven around the central axis that is orthogonal to the elliptical vibration generating surface of the vibrator. An elliptical vibration is generated by combining a longitudinal primary resonance vibration resulting from an expansion and a contraction of the vibrator in a direction of the central axis and a torsional secondary resonance vibration or a torsional tertiary resonance vibration resulting from twisting around the central axis. The dimension ratio of the rectangle of the vibrator is chosen such that a resonance frequency of the longitudinal primary resonance vibration and a resonance frequency of the torsional secondary resonance vibration or the torsional tertiary resonance vibration match. The vibrator includes a plurality of regions in a surface orthogonal to the central axis. Deformations of the regions adjacent to each other along the direction of the central axis are mutually different in the regions. The vibrator expands and contracts in a direction along a polarization direction thereof.

In the ultrasonic motor according to the present invention, it is preferable that each of the regions among the regions is deformed in a single direction to generate the torsional secondary resonance vibration resulting from twisting around the central axis.

In the ultrasonic motor according to the present invention, it is preferable that each of the regions among the regions is deformed in a mutually different direction to generate the torsional tertiary resonance vibration resulting from twisting around the central axis.

BRIEF DESCRIPTION OF THE DRAWINGS

FIG. 8A is a left side view and FIG. 8B is a right side view of the multilayered piezoelectric element shown in FIG. 7;

FIG. 14A is a left side view of the multilayered piezoelectric element shown in FIG. 13, and FIG. 14B is a right side view of the multilayered piezoelectric element shown in FIG. 13;

DETAILED DESCRIPTION OF THE INVENTION

Exemplary embodiments of an ultrasonic motor according to the present invention are explained in detail below by using the accompanying drawings. The present invention is not limited by the following embodiments.

First Embodiment

Figure 1:
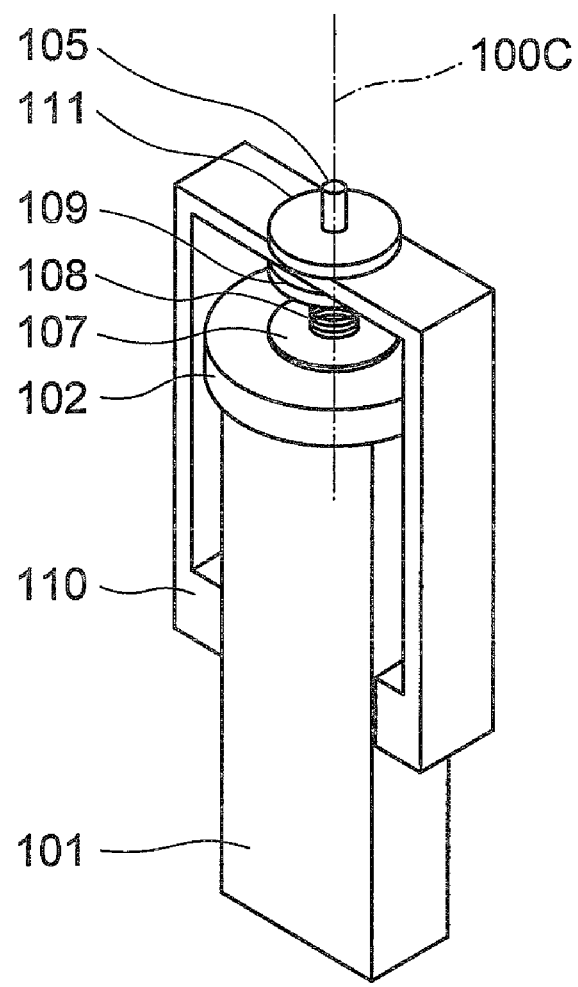
FIG. 1 is a perspective view of a structure of an ultrasonic motor according to a first embodiment of the present invention.
Figure 2:
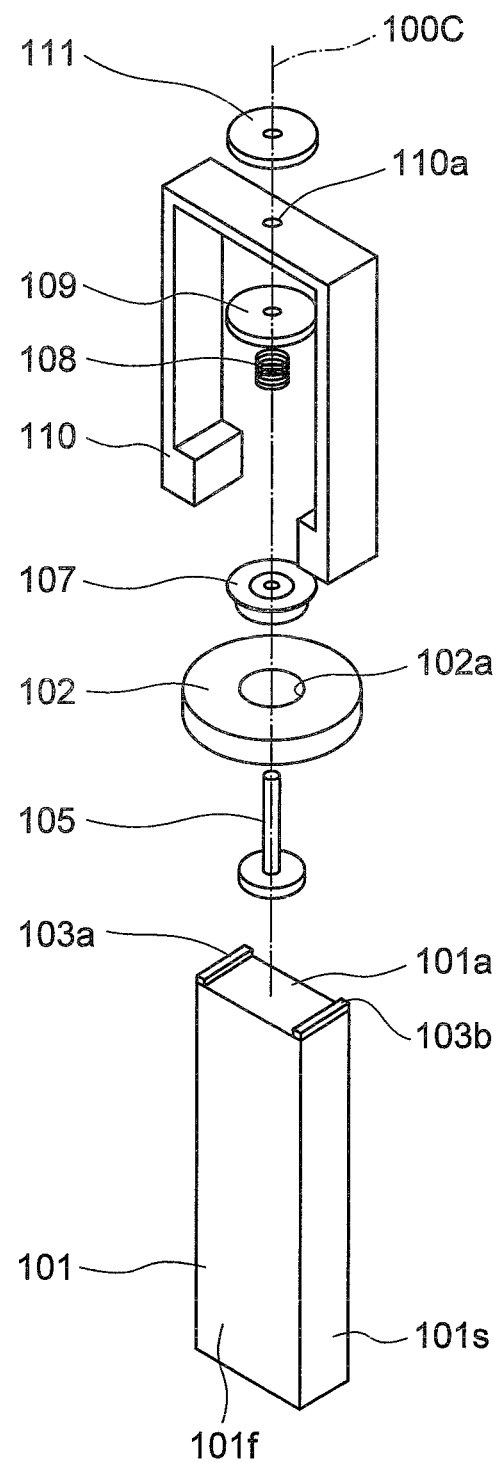
FIG. 2 is an exploded perspective view of the structure of the ultrasonic motor according to the first embodiment of the present invention.

An ultrasonic motor 100 according to the first embodiment of the present invention generates an elliptical vibration by combining a longitudinal primary resonance vibration and a torsional secondary resonance vibration. As shown in FIGS. 1 and 2, the ultrasonic motor 100 includes a vibrator 101 and a rotor 102.

The vibrator 101 is a piezoelectric element of a substantially right-angled parallelepiped shape having a dimension ratio of a rectangle in a cross-section orthogonal to its central axis 100c (rotation axis). The rotor 102 is substantially disk-shaped. A bottom surface of the rotor 102 contacts with friction contact members 103a and 103b that are arranged on an elliptical vibration generating surface 101a of the vibrator 101. The rotor 102 is rotation driven around the central axis 100c that is orthogonal to the elliptical vibration generating surface 101a of the vibrator 101.

A structure for coupling the rotor 102 to the vibrator 101 is explained below.

A holder 110 is fixed near a node of the vibrator 101 (piezoelectric element). A shaft 105, the rotor 102, a bearing 107, a spring 108, and a cap ring 109 are arranged in this order between the elliptical vibration generating surface 101a of the vibrator 101 and the holder 110. All these members are concentrically arranged on the central axis 100c.

The bearing 107 is engaged with a central hole 102a of the rotor 102. The shaft 105 passes through the central hole 102a of the rotor 102 and a hole of the bearing 107 along the central axis 100c. A base of the shaft 105 rests on the elliptical vibration generating surface 101a of the vibrator 101.

The shaft 105, which penetrates the central hole 102a of the rotor 102 and the hole of the bearing 107, passes through the spring 108 and a hole of the cap ring 109 in this order, and then passes through a through hole 110a provided in an upper part of the holder 110. A ring 111 is threadably mounted on an upper tip of the shaft 105 that comes out of the through hole 110a. The shaft 105 is thus fixed to the holder 110.

The cap ring 109 and the shaft 105 are provided with threads, and the cap ring 109 is threadably mounted on the shaft 105. A position of the cap ring 109 on the shaft 105, i.e., a pressing force of the spring 108, can be adjusted by rotating the cap ring 109. In other words, a force by which the rotor 102 presses the friction contact members 103a and 103b can be adjusted by rotating the cap ring 109.

How resonance frequencies are matched in the vibrator 101 (piezoelectric element) included in the ultrasonic motor 100 is explained below referring to FIGS. 3A to 3E and FIG. 4.

Figure 3A:
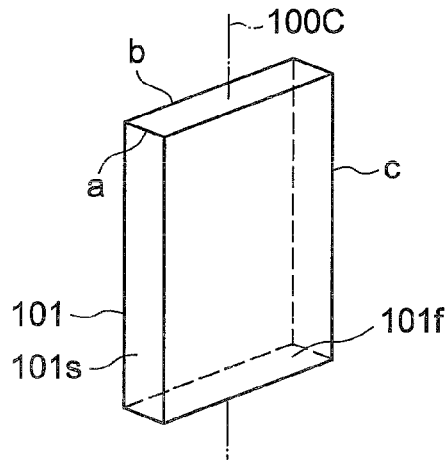
FIG. 3A is a perspective view of a schematic structure of a vibrator according to the first embodiment.
Figure 3B:
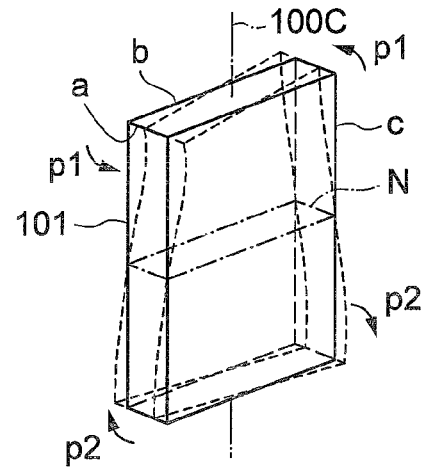
FIG. 3B is a perspective view that depicts with a dotted line a vibration state of the vibrator in a torsional primary vibration mode.

As shown in FIG. 3A, the vibrator 101 has a substantially right-angled parallelepiped shape. A length of a short side 101s of a rectangular cross-section that is orthogonal to the central axis 100c is denoted by a, a length of a long side 101f is denoted by b, and a height of the vibrator 101 along the central axis 100c is denoted by c. In the following explanation, a height direction of the vibrator 101 is assumed to be a direction of vibrations in a longitudinal primary vibration mode as well as an axis direction of torsion in the torsional vibration. Moreover, a, b, and c satisfy a<b<c.

The resonance frequency in the longitudinal primary vibration mode and the resonance frequency in a torsional secondary vibration mode, or the resonance frequency in the longitudinal primary vibration mode and the resonance frequency in a torsional tertiary vibration mode can be matched by appropriately choosing a, b, and c in the vibrator 101.

Figure 3C:
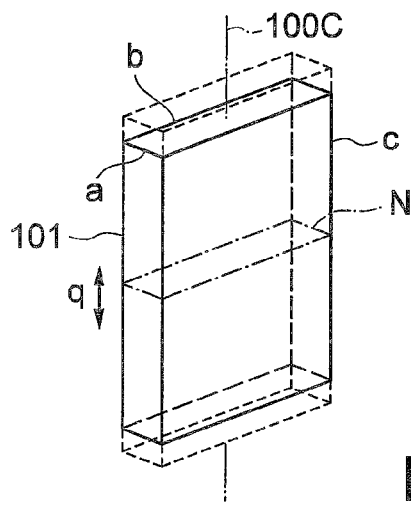
FIG. 3C is a perspective view that depicts with a dotted line a vibration state of the vibrator in a longitudinal primary vibration mode.
Figure 3D:
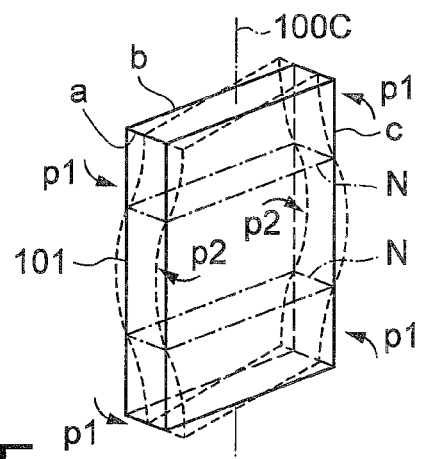
FIG. 3D is a perspective view that depicts with a dotted line a vibration state of the vibrator in a torsional secondary vibration mode.
Figure 3E:
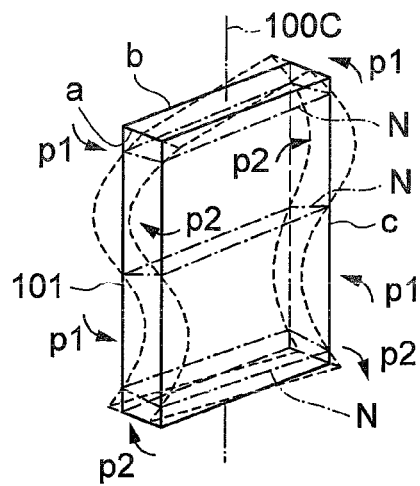
FIG. 3E is a perspective view that depicts with a dotted line a vibration state of the vibrator in a torsional tertiary vibration mode.

In FIGS. 3B to 3E, directions of the torsional vibration are shown by p1 and p2, a direction of the longitudinal vibration is shown by q, and a node of the vibrations is shown by N. One node N is present at central positions in a height direction in each of the torsional primary vibration mode (FIG. 3B) and the longitudinal primary vibration mode (FIG. 3C). Two nodes N are present at two positions in the height direction in the torsional secondary vibration mode (FIG. 3D). Three nodes N are present at three positions in the height direction in the torsional tertiary vibration mode (FIG. 3E).

In FIGS. 3B to 3E, a continuous line is used to show a shape of the vibrator 101 before it is subjected to vibrations and a dotted line is used to show the shape of the vibrator 101 after it is subjected to vibrations.

Figure 4:
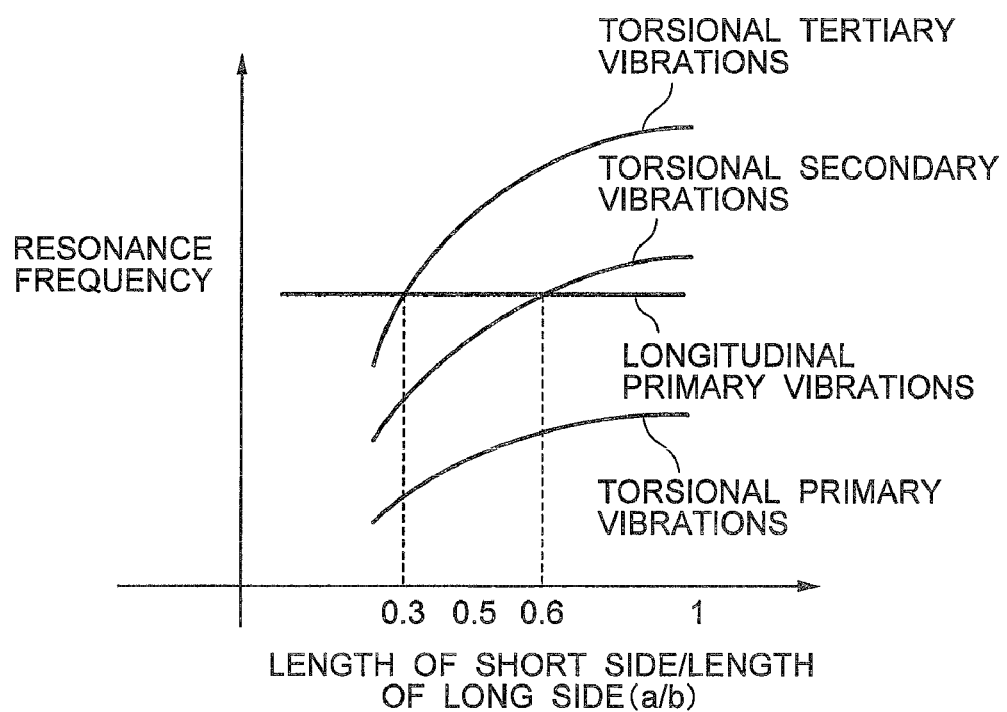
FIG. 4 is a graph that depicts resonance frequencies of each of the modes when a height of the vibrator is fixed and a parameter represented by a length of a short side/a length of a long side is plotted on an axis of abscissa.

As can be seen in FIG. 4, when the parameter a/b is varied, although the resonance frequency of the longitudinal primary vibration mode stays constant without depending on the parameter a/b, the resonance frequencies of the torsional vibration increase with an increase in the parameter a/b.

Furthermore, the resonance frequency of the torsional primary vibration mode never matches with the resonance frequency of the longitudinal primary vibration mode irrespective of the value of the parameter a/b. On the contrary, the resonance frequency of the torsional secondary vibration mode matches with the resonance frequency of the longitudinal primary vibration mode near a position where the parameter a/b is 0.6. Moreover, the resonance frequency of the torsional tertiary vibration mode matches with the resonance frequency of the longitudinal primary vibration mode near a position where the parameter a/b is near 0.3. Therefore, the lengths a and b are chosen in the vibrator 101 according to the first embodiment such that the parameter a/b falls between 0.25 and 0.35 in the longitudinal primary vibration and the torsional tertiary vibration, and falls between 0.5 and 0.6 in the longitudinal primary vibration and the torsional secondary vibration.

In the ultrasonic motor 100, the elliptical vibration is generated by combining the longitudinal primary resonance vibration resulting from an expansion and a contraction of the vibrator 101 along the central axis 100c (rotation axis) and the torsional secondary resonance vibration or a torsional tertiary resonance vibration resulting from twisting of the vibrator 101 around the central axis 100c. A ratio (proportion) of the lengths a and b is chosen such that the resonance frequencies of the longitudinal primary resonance vibration resulting from the expansion and the contraction of the vibrator 101 along the central axis 100c and the torsional secondary resonance vibration or the torsional tertiary resonance vibration resulting from twisting of the vibrator 101 around the central axis 100c almost match.

Figure 5:
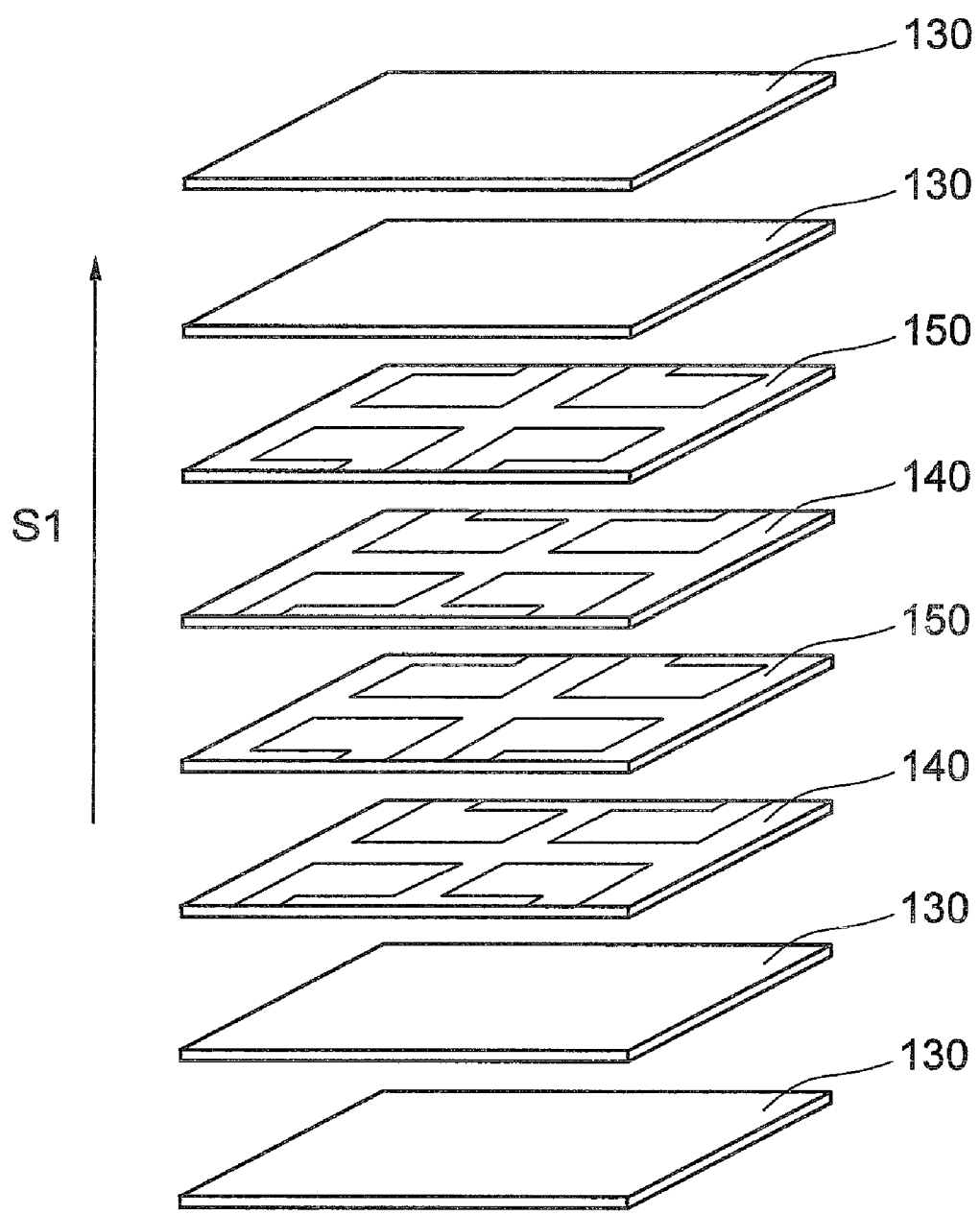
FIG. 5 is an exploded perspective view of a structure of a multilayered piezoelectric element according to the first embodiment.
Figure 6A:
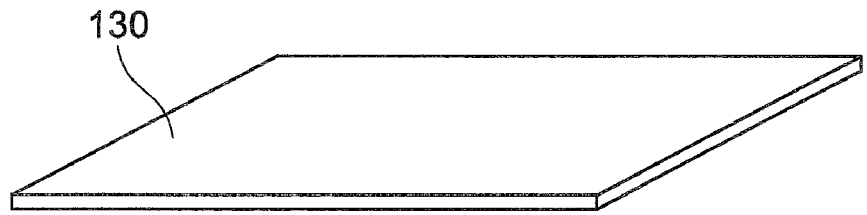
FIG. 6A is a perspective view of a structure of a first piezoelectric sheet.
Figure 6B:
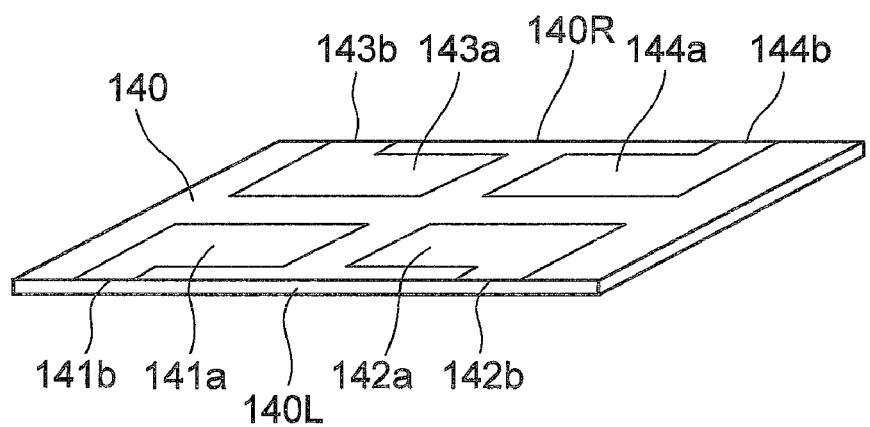
FIG. 6B is a perspective view of a structure of a second piezoelectric sheet.
Figure 6C:
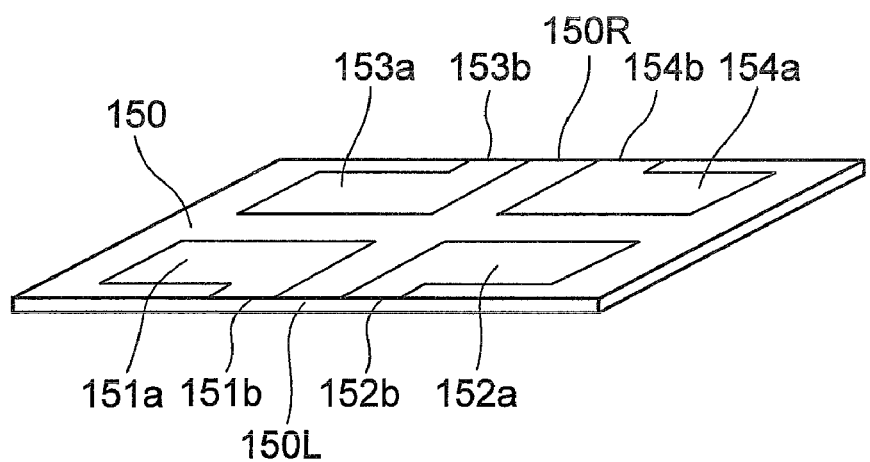
FIG. 6C is a perspective view of a structure of a third piezoelectric sheet according to the first embodiment.
Figures 7A, 7B:
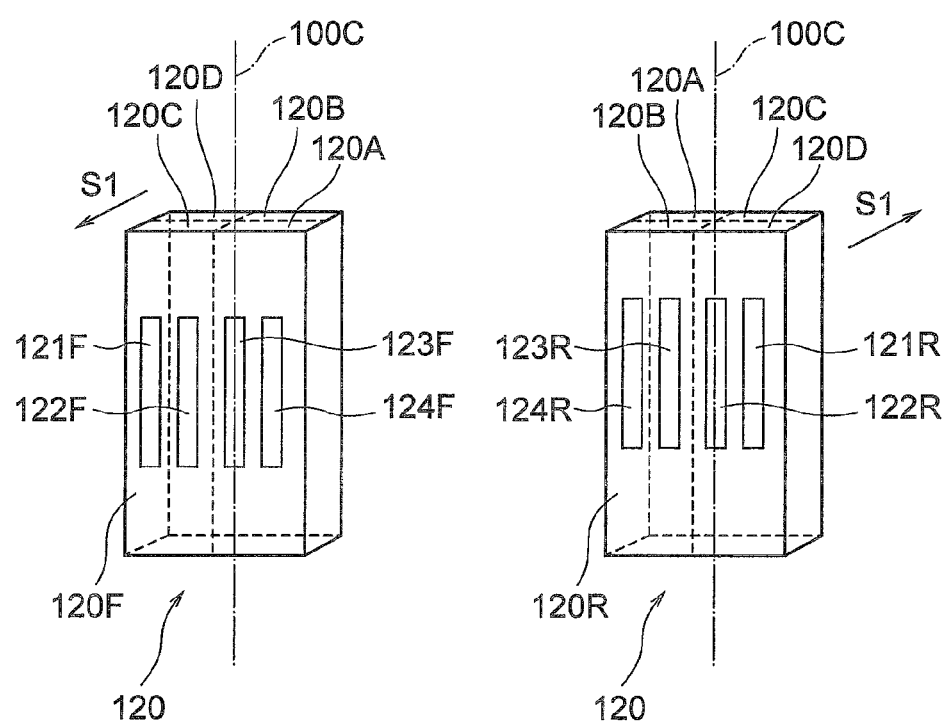
FIG. 7A is a perspective view from an upper front side of the multilayered piezoelectric element according to the first embodiment.
FIG. 7B is perspective view from an upper rear side of the multilayered piezoelectric element.

The vibrator 101 includes a multilayered piezoelectric element 120 in which a plurality of piezoelectric sheets is stacked. The longitudinal primary resonance vibration and the torsional secondary resonance vibration or the torsional tertiary resonance vibration are generated in the vibrator 101 because of formation of activation regions by polarization in a thickness direction of the piezoelectric sheets. A structure of the multilayered piezoelectric element 120 forming the vibrator 101 is explained below referring to FIGS. 5 to 8B. FIG. 5 is an exploded perspective view of the structure of the multilayered piezoelectric element 120. FIG. 6A is a perspective view of a structure of a first piezoelectric sheet 130, FIG. 6B is a perspective view of a structure of a second piezoelectric sheet 140, and FIG. 6C is a perspective view of a structure of a third piezoelectric sheet 150. FIG. 7A is a perspective view from an upper front side of the multilayered piezoelectric element 120 and FIG. 7B is a perspective view from an upper rear side of the multilayered piezoelectric element 120. FIG. 8A is a left side view of the multilayered piezoelectric element 120 shown in FIGS. 7A and 7B, and FIG. 8B is a right side view of the multilayered piezoelectric element 120 shown in FIGS. 7A and 7B.

As shown in FIG. 5, the multilayered piezoelectric element 120 includes, stacked from the most upper side in the thickness direction (a direction indicated by an arrow S1 in FIG. 5), two first piezoelectric sheets 130, two pairs of the third piezoelectric sheets 150 and the second piezoelectric sheets 140 alternately layered, and two first piezoelectric sheets 130.

The number and arrangement of the piezoelectric sheets included in the multilayered piezoelectric element 120 can be varied depending on the specification of the vibrator 101.

As shown in FIGS. 6A to 6C, the first piezoelectric sheet 130, the second piezoelectric sheet 140, and the third piezoelectric sheet 150 have an identical shape of a rectangular plate. As the first piezoelectric sheet 130, the second piezoelectric sheet 140, and the third piezoelectric sheet 150, for example, hard-type lead zirconate titanate piezoelectric elements are used. The piezoelectric element consisting of the second piezoelectric sheet 140 and the third piezoelectric sheet 150 includes an internal electrode and an activated area polarized in the thickness direction.

Four internal electrodes are formed by way of printing on an upper surface of each second piezoelectric sheet 140. Four internal electrodes are formed by way of printing also on a surface of each of the third piezoelectric sheet 150.

Concrete structures of the internal electrodes and external electrodes are explained below.

As shown in FIG. 6B, a first internal electrode 141a of + phase, a second internal electrode 142a of + phase, a third internal electrode 143a of + phase, and a fourth internal electrode 144a of + phase are formed on the second piezoelectric sheet 140. The first internal electrode 141a of + phase and the third internal electrode 143a of + phase are arranged close to one end along the long side (a horizontal direction in FIGS. 6A to 6C) of the second piezoelectric sheet 140 facing to and isolated from each other. The second internal electrode 142a of + phase and the fourth internal electrode 144a of + phase are arranged close to the other end along the long side of the second piezoelectric sheet 140 facing to and isolated from each other.

The first internal electrode 141a of + phase and the third internal electrode 143a of + phase are extended such that their protrusions 141b and 143b are exposed to an upper part of long sides 140L and 140R of the second piezoelectric sheet 140. The second internal electrode 142a of + phase and the fourth internal electrode 144a of + phase are extended such that their protrusions 142b and 144b are respectively exposed to long sides 140L and 140R of the second piezoelectric sheet 140. The protrusions 141b and 143b are arranged along the long sides of the second piezoelectric sheet 140 facing to each other. The protrusions 142b and 144b are also arranged facing to each other.

Meanwhile, a first internal electrode 151a of − phase, a second internal electrode 152a of − phase, a third internal electrode 153a of − phase, and the fourth internal electrode 154a of − phase are formed on the third piezoelectric sheet 150 as shown in FIG. 6C. The first internal electrode 151a of − phase and the third internal electrode 153a of − phase are arranged close to one end along the long side of the third piezoelectric sheet 150 facing to and isolated from each other. The second internal electrode 152a of − phase and the fourth internal electrode 154a of − phase are arranged close to the other end along the long side of the third piezoelectric sheet 150 facing to and isolated from each other.

The first internal electrode 151a of − phase and the third internal electrode 153a of − phase are extended such that their protrusions 151b and 153b are respectively exposed to long sides 150L and 150R of the second piezoelectric sheet 150. The second internal electrode 152a of − phase and the fourth internal electrode 154a of − phase are extended such that their protrusions 152b and 154b are respectively exposed to long sides 150L and 150R of the second piezoelectric sheet 150. The protrusions 151b and 153b are arranged facing to each other. The protrusions 152b and 154b are also arranged facing to each other.

The first internal electrode 141a of + phase and the first internal electrode 151a of − phase as a pair, the second internal electrode 142a of + phase and the second internal electrode 152a of − phase as a pair, the third internal electrode 143a of + phase and the third internal electrode 153a of − phase as a pair, and the fourth internal electrode 144a of + phase and a fourth internal electrode 154a of − phase as a pair are respectively formed at the positions that correspond to each other when the second piezoelectric sheet 140 and the third piezoelectric sheet 150 are stacked.

The external electrodes are formed on the protrusions 141b, 142b, 143b, 144b, 151b, 152b, 153b, and 154b of internal electrodes, for example, by way of printing of silver paste.

The external electrodes formed on the protrusions 141b compose a first external electrode group 121F of + phase on a front surface 120F of the multilayered piezoelectric element 120, and the external electrodes formed on the protrusions 142b compose a fourth external electrode group 124F of + phase on a front surface 120F of the multilayered piezoelectric element 120 (FIGS. 7A to 8B).

The external electrodes formed on the protrusions 143b compose a first external electrode group 121R of + phase on a rear surface 120R of the multilayered piezoelectric element 120, and the external electrodes formed on the protrusion 144b compose a fourth external electrode group 124R of + phase on the rear surface 120R of the multilayered piezoelectric element 120.

The external electrodes formed on the protrusion 151b compose a second external electrode group 122F of − phase on the front surface 120F of the piezoelectric element 120. The external electrodes formed on the protrusion 152b compose a third external electrode group 123F of − phase on the front surface 120F of the piezoelectric element 120. Meanwhile, the external electrodes are not shown in FIGS. 1 and 2.

The external electrodes formed on the protrusion 153b compose a second external electrode group 122R of − phase on the rear surface 120R of the piezoelectric element 120. The external electrodes formed on the protrusion 154b compose a third external electrode group 123R of − phase on the front surface 120F of the piezoelectric element 120.

The external electrodes are respectively connected to an external power supply (not shown) of the ultrasonic motor 100. As an example, an FPC (flexible print circuit) is used for connection and one end of the FPC is connected to each electrode group.

Eight external electrodes formed on the front surface 120F or the rear surface 120R of the multilayered piezoelectric element 120 compose four pairs of phases by respectively coupling the first external electrode group 121F of + phase and the second external electrode group 122F of − phase as a pair, the third external electrode group 123F of − phase and the fourth external electrode group 124F of + phase as a pair, the first external electrode group 121R of + phase and the second external electrode group 122R of − phase as a pair, and the third external electrode group 123R of − phase and the fourth external electrode group 124R of + phase as a pair.

From another aspect, the multilayered piezoelectric element 120 consists of four regions 120A, 120B, 120C, and 120D with an angle of 90 degrees for each, separated by orthogonal surfaces around the central axis 100c (FIGS. 7A to 8B).

The region 120A corresponds to the phases of the third external electrode group 123F of − phase and the fourth external electrode group 124F of + phase, the region 120B corresponds to the phases of the third external electrode group 123R of − phase and the fourth external electrode group 124R of + phase, the region 120C corresponds to the phases of the first external electrode group 121F of + phase and the second external electrode group 122F of − phase, and the region 120D corresponds to the phases of the first external electrode group 121R of + phase and the second external electrode group 122R of − phase, respectively.

By this structure, each region is deformed to a single direction in response to a signal applied from the external power supply.

Figure 9:
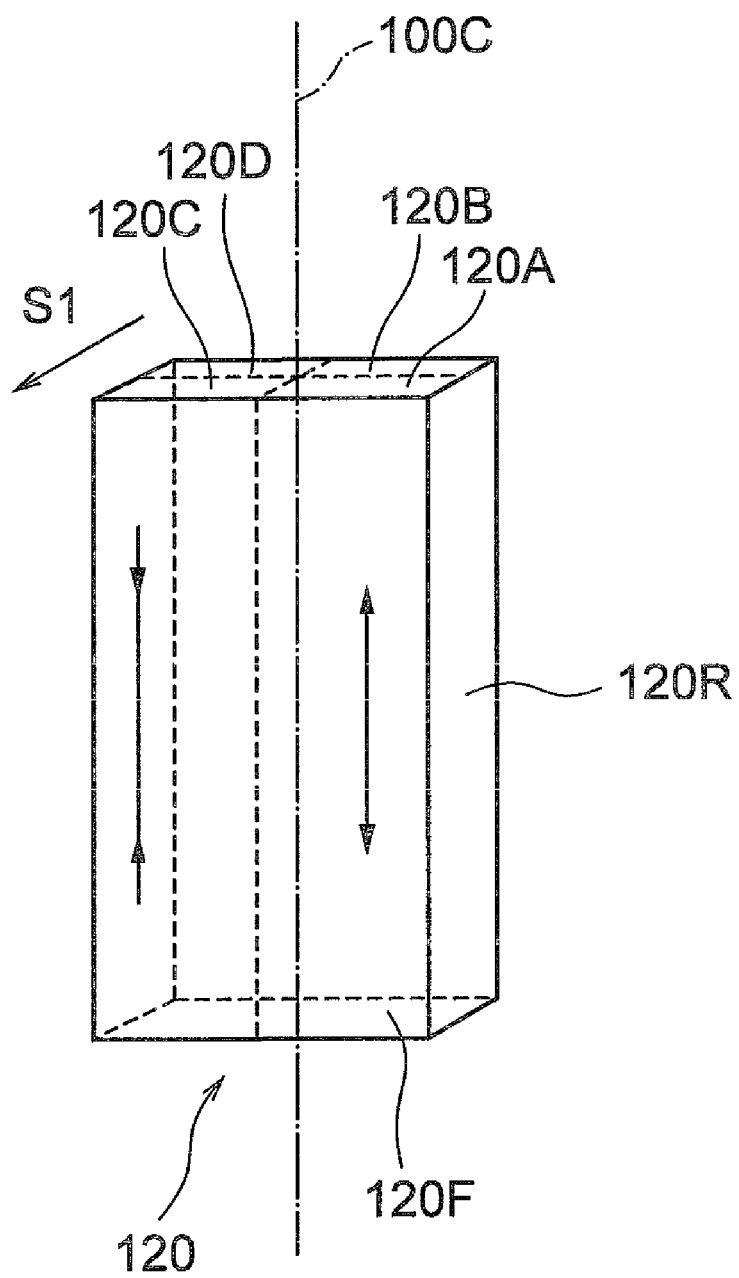
FIG. 9 is a perspective view from the upper front side of the multilayered piezoelectric element of the first embodiment that shows a deformation in each area of the multilayered piezoelectric element.
Figures 10A, 10B, 10C, 10D:
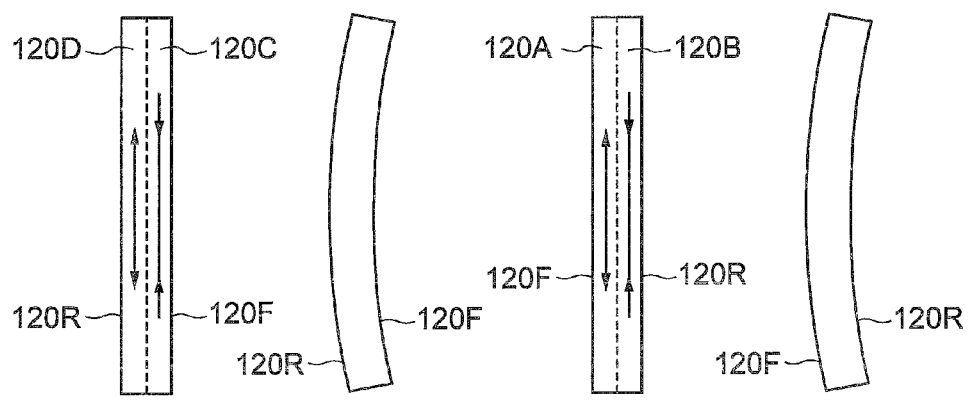
FIG. 10A is a left side view of the multilayered piezoelectric element shown in FIG. 9.
FIG. 10B is a left side view of the deformation of the multilayered piezoelectric element shown in FIG. 9.
FIG. 10C is a right side view of the multilayered piezoelectric element shown in FIG. 9.
FIG. 10D is a right side view of the deformation of the multilayered piezoelectric element shown in FIG. 9.

An operation of the vibrator 101 and the multilayered piezoelectric element 120 is explained below referring to FIG. 9 and FIGS. 10A to 10D. FIG. 9 is a figure that shows the deformation of each region of the multilayered piezoelectric element 120 and it is an exploded view from an upper front side. FIG. 10A is a left side view of the multilayered piezoelectric element 120 shown in FIG. 9, FIG. 10B is a left side view of the deformation of the multilayered piezoelectric element 120 shown in FIG. 9, FIG. 10C is a right side view of the multilayered piezoelectric element 120 shown in FIG. 9, and FIG. 10D is a right side view of the deformation of the multilayered piezoelectric element 120 shown in FIG. 9. The external electrodes are not shown in FIG. 9 and FIGS. 10A to 10D.

In the examples shown in FIG. 9 and FIGS. 10A to 10D, a signal is applied from the external power supply to each phase between the first external electrode group 121F and the second external electrode group 122F, between the third external electrode group 123F and the fourth external electrode group 124F, between the first external electrode group 121R and the second external electrode group 122R, and between the third external electrode group 123R and the fourth external electrode group 124R, respectively. By this application of signal, the regions 120A and 120D are deformed so that they are expanded along the central axis 100c, and the regions 120B and 120C are deformed so that they are contracted along the central axis 100c. That is, the adjacent regions of the multilayered piezoelectric element 120 are deformed along the central axis 100c to the opposite directions and the directions of deformation are along a direction of polarization (direction S1 of stacking). Meanwhile, the directions of deformation of the regions can be different from the directions shown in FIG. 9 and FIGS. 10A to 10D as far as the directions of deformation of the adjacent regions are opposite from each other.

As shown here, when four regions are deformed, by combining the longitudinal primary resonance vibration (FIG. 3C) and the torsional secondary resonance vibration (FIG. 3D) along the central axis 100c, the elliptical vibration is generated on both sides of the height direction of the vibrator 101. Accordingly, elliptical vibration is propagated to the rotor 102 through the friction contact members 103a and 103b. In addition, a torsional secondary resonance vibration to the opposite direction can be generated by applying signals to each phase so that each region is deformed to the directions opposite to the directions shown above.

With the structure explained above, the vibrator 101 that consists of a single part of a simple structure without a groove etc., can be obtained. The cost of the ultrasonic motor 100 that includes this vibrator 101 can be reduced because it requires only a small number of parts and can be easily assembled. Furthermore, the ultrasonic motor 100 can easily generate the longitudinal vibration and the torsional vibration, and rotate the rotor 102 using the elliptical vibration by combining the longitudinal vibration and the torsional vibration.

Second Embodiment

An ultrasonic motor according to the second embodiment of the present invention differs from the ultrasonic motor 100 according to the first embodiment in the point that an elliptical vibration is generated by combining a longitudinal primary resonance vibration and a torsional tertiary resonance vibration. Structures are the same as those of the first embodiment excepting the piezoelectric sheets and accordingly, the same reference symbols will be used and the descriptions of the items other than the piezoelectric sheets are not shown.

A vibrator in the second embodiment includes a multilayered piezoelectric element 220 formed by a plurality of piezoelectric sheets stacked together and that generates the longitudinal primary resonance vibration and the torsional tertiary resonance vibration by an activated area polarized in a thickness direction of the piezoelectric sheets.

A structure of the multilayered piezoelectric element 220 forming the vibrator is explained below using FIGS. 11 to 14B.

Figure 11:
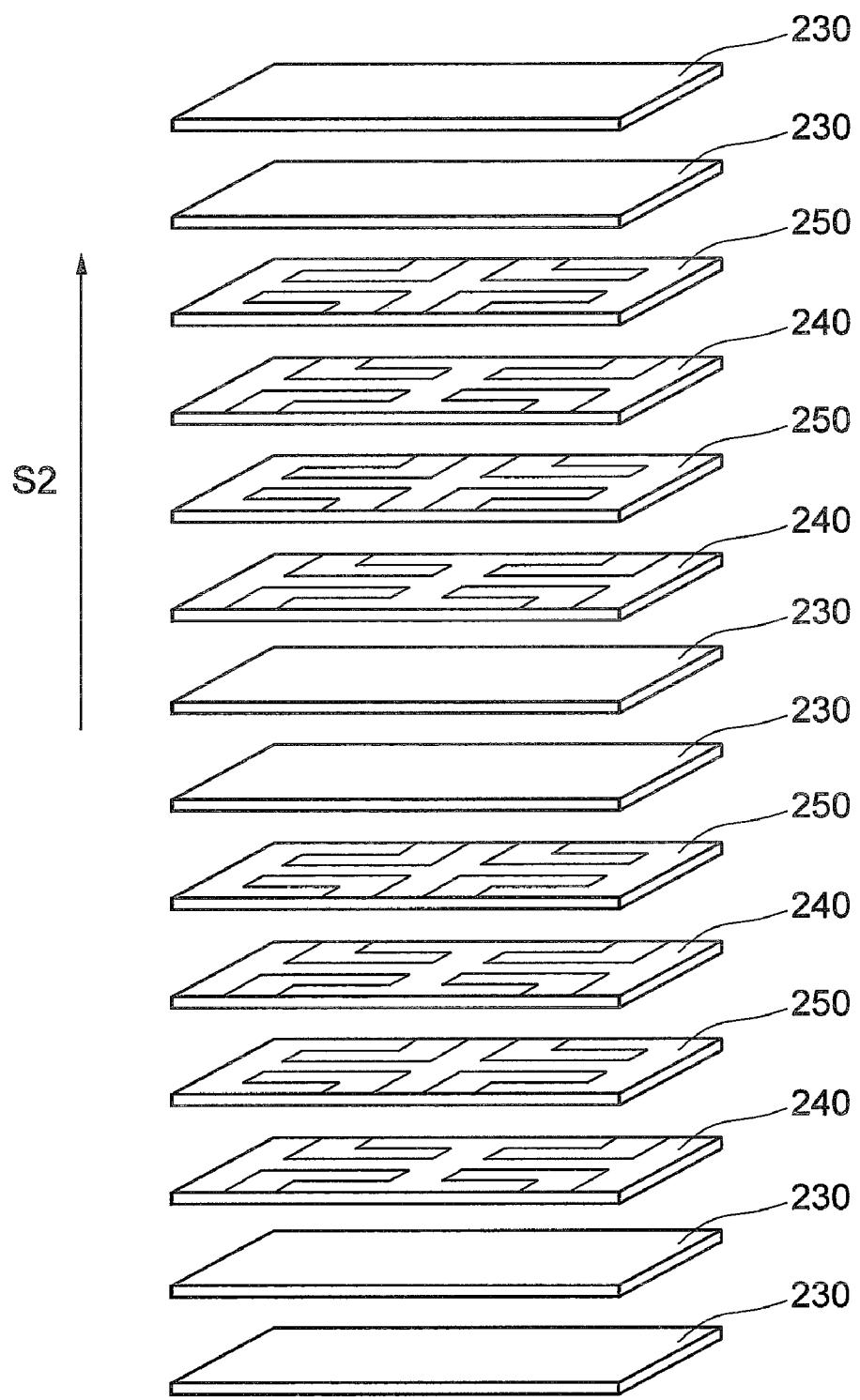
FIG. 11 is an exploded perspective view of a structure of a multilayered piezoelectric element according to a second embodiment.
Figure 12A:
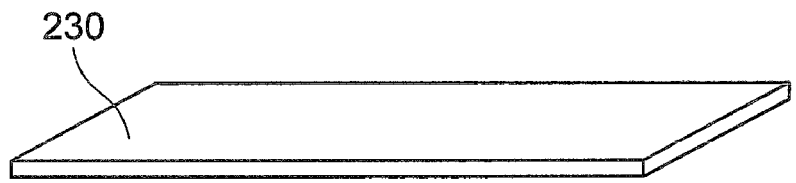
FIG. 12A is a perspective view of a structure of a first piezoelectric sheet.
Figure 12B:
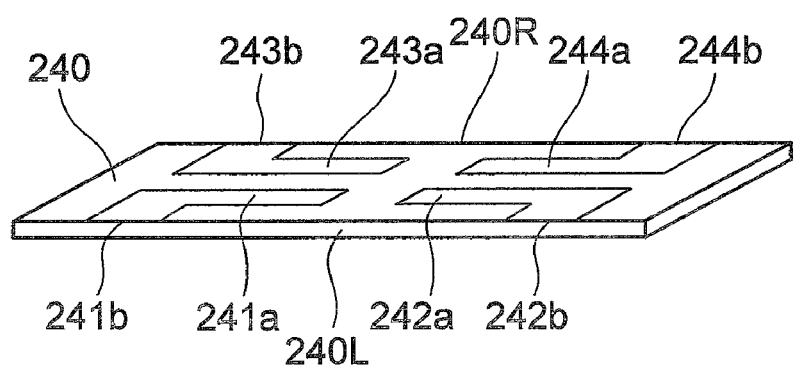
FIG. 12B is a perspective view of a structure of a second piezoelectric sheet.
Figure 12C:
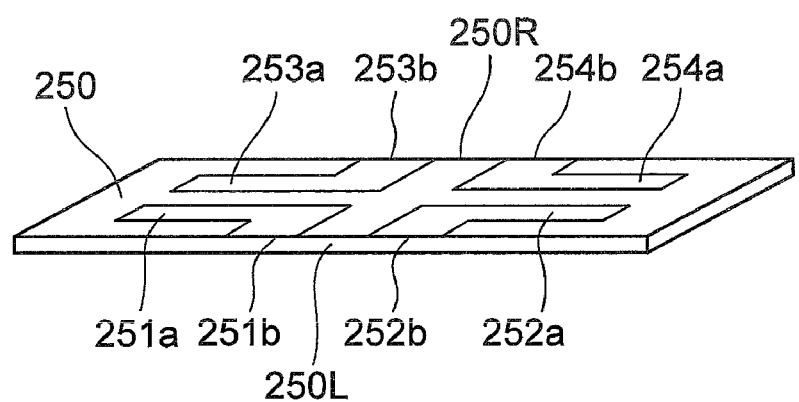
FIG. 12C is a perspective view of a structure of a third piezoelectric sheet according to the second embodiment.
Figure 13A:
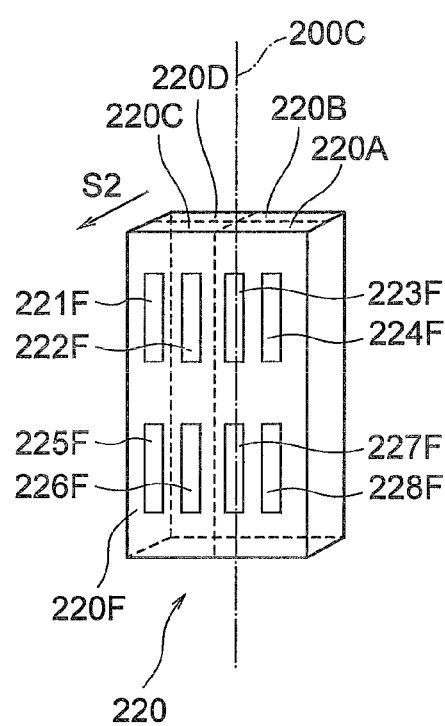
FIG. 13A is a perspective view from an upper front side of the multilayered piezoelectric element according to the second embodiment.
Figure 13B:
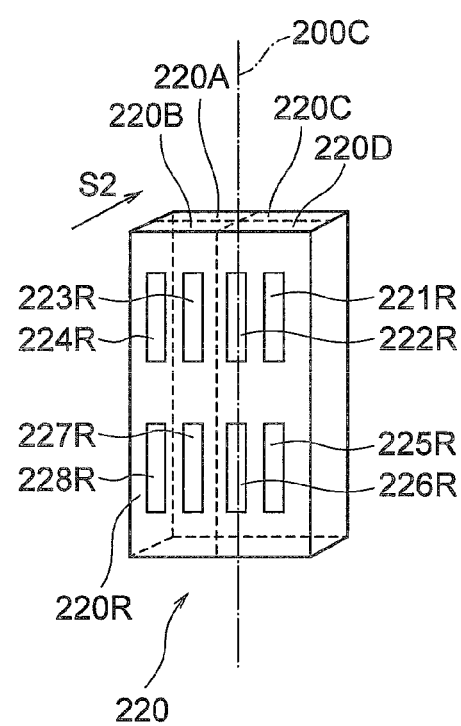
FIG. 13B is perspective view from an upper rear side of the multilayered piezoelectric element.

FIG. 11 is an exploded perspective view of the structure of the multilayered piezoelectric element 220. FIG. 12A is a perspective view of a structure of a first piezoelectric sheet 230. FIG. 12B is a perspective view of a structure of a second piezoelectric sheet 240. FIG. 12C is a perspective view of a structure of a third piezoelectric sheet 250. FIG. 13A is a perspective view from an upper front side of the multilayered piezoelectric element 220, and FIG. 13A is a perspective view from an upper rear side of the multilayered piezoelectric element 220. FIG. 14A is a left side view of the multilayered piezoelectric element 220 shown in FIGS. 13A and 13B. FIG. 14B is a right side view of the multilayered piezoelectric element 220 shown in FIGS. 13A and 13B.

As shown in FIG. 11, the multilayered piezoelectric element 220 includes, stacked from the most upper side in the thickness direction (a direction indicated by an arrow S2 in FIG. 11), two first piezoelectric sheets 230, two pairs of the third piezoelectric sheets 250 and the second piezoelectric sheets 240 alternately layered, two first piezoelectric sheets 230, two pairs of the third piezoelectric sheets 250 and the second piezoelectric sheets 240 alternately layered, and two first piezoelectric sheets 230.

As shown in FIGS. 12A to 12C, the first piezoelectric sheet 230, the second piezoelectric sheet 240, and the third piezoelectric sheet 250 have an identical shape of a rectangular plate. As the first piezoelectric sheet 230, the second piezoelectric sheet 240, and the third piezoelectric sheet 250, for example, hard-type lead zirconate titanate piezoelectric elements are used. The piezoelectric element consisting of the second piezoelectric sheet 240 and the third piezoelectric sheet 250 includes an internal electrode and an activated area polarized in the thickness direction.

The concrete structures of the internal electrode and an external electrode are explained below.

As shown in FIG. 12B, a first internal electrode 241a of + phase, a second internal electrode 242a of + phase, a third internal electrode 243a of + phase, and a fourth internal electrode 244a of + phase are formed on the second piezoelectric sheet 240. The first internal electrode 241a of + phase and the third internal electrode 243a of + phase are placed at a top position, facing to and isolated from each other along one-end sides of long sides (left-right direction in FIGS. 12A to 12C) of the second piezoelectric sheet 240. The second internal electrode 242a of + phase and the fourth internal electrode 244a of + phase are arranged at a bottom position, facing to and isolated from each other along the other-ends sides of the second piezoelectric sheet 240.

The first internal electrode 241a of + phase and the third internal electrode 243a of + phase are extended so that their protrusions 241b and 243b are respectively exposed to long sides 240L and 240R of the second piezoelectric sheet 240. The second internal electrode 242a of + phase and the fourth internal electrode 244a of + phase are extended so that their protrusions 242b and 244b are respectively exposed to the long sides 240L and 240R of the second piezoelectric sheet 240. The protrusions 241b and 243b are arranged at positions facing to each other along the long side of the second piezoelectric sheet 240. The protrusions 242b and 244b are also arranged at positions facing to each other.

Similarly, as shown in FIG. 12C, a first internal electrode 251a of – phase, a second internal electrode 252a of – phase, a third internal electrode 253a of – phase, and a fourth internal electrode 254a of – phase are formed on the third piezoelectric sheet 250. The first internal electrode 251a of – phase and the third internal electrode 253a of – phase are placed at the top position mutually facing to and isolated from each other along the one-end sides of the third piezoelectric sheet 250. The second internal electrode 252a of – phase and the fourth internal electrode 254a of – phase are arranged at the bottom position facing to and isolated from each other along the other-end sides of the third piezoelectric sheet 250.

The first internal electrode 251a of – phase and the third internal electrode 253a of – phase are extended such that their protrusions 251b and 253b are respectively exposed to an upper part of long sides 250L and 250R of the third piezoelectric sheet 250. The second internal electrode 252a of – phase and the fourth internal electrode 254a of – phase are extended so that their protrusions 252b and 254b are respectively exposed to a lower part of the long sides 250L and 250R of the third piezoelectric sheet 250. The protrusions 251b and 253b are arranged at the positions facing to each other along the long side of the third piezoelectric sheet 250. The protrusions 252b and 254b are also arranged at the positions facing to each other.

The first internal electrode 241a of + phase and the first internal electrode 251a of – phase, the second internal electrode 242a of + phase and the second internal electrode 252a of – phase, the third internal electrode 243a of + phase and the third internal electrode 253a of – phase, and the fourth internal electrode 244a of + phase and the fourth internal electrode 254a of – phase, are respectively formed on a position facing to each other when the second piezoelectric sheet 240 and the third piezoelectric sheet 250 are stacked.

The external electrodes are formed on the protrusions 241b, 242b, 243b, 244b, 251b, 252b, 253b, and 254b of the internal electrodes, for example, by way of printing of silver paste.

The external electrodes formed on the protrusion 241b compose a first external electrode group 221F of + phase and a fifth external electrode group 225F of + phase on a front surface 220F of the multilayered piezoelectric element 220. The external electrodes formed on the protrusion 242b compose a fourth external electrode group 224F of + phase and an eighth external electrode group 228F of + phase on the front surface 220F of the multilayered piezoelectric element 220 (FIGS. 13A to 14B).

The external electrodes formed on the protrusion 243b compose a first external electrode group 221R of + phase and a fifth external electrode group 225R of + phase on a rear surface 220R of the multilayered piezoelectric element 220. The external electrodes formed on the protrusion 244b compose a fourth external electrode group 224R of + phase and an eighth external electrode group 228R of + phase on the rear surface 220R of the multilayered piezoelectric element 220.

The external electrodes formed on the protrusion 251b compose a second external electrode group 222F of – phase and a sixth external electrode group 226F of – phase on a front surface 220F of the multilayered piezoelectric element 220. The external electrodes formed on the protrusion 252b compose a third external electrode group 223L of – phase and a seventh external electrode group 227F of – phase on the front surface 220F of the multilayered piezoelectric element 220.

Moreover, the external electrodes formed on the protrusion 253b compose a second external electrode group 222R of − phase and a sixth external electrode group 226R of − phase on a rear surface 220R of the multilayered piezoelectric element 220. The external electrodes formed on the protrusion 254b compose a third external electrode group 223R of − phase and a seventh external electrode group 227R of − phase on the rear surface 220R of the multilayered piezoelectric element 220.

Sixteen external electrodes formed on the front surface 220F or the rear surface 220R of the multilayered piezoelectric element 220 are coupled into four pairs of phases on each of the front surface 220F and the rear surface 220R of the multilayered piezoelectric element 220. Concretely, the first external electrode group 221F of + phase and the second external electrode group 222F of − phase as a pair, the third external electrode group 223F of − phase and the fourth external electrode group 224F of + phase as a pair, the fifth external electrode group 225F of + phase and the sixth external electrode group 226F of − phase as a pair, and the seventh external electrode group 227F of − phase and the eighth external electrode group 228F of + phase as a pair, respectively, compose the four pairs of phases on the front surface 220F of the multilayered piezoelectric element 220. The first external electrode group 221R of + phase and the second external electrode group 222R of − phase as a pair, the third external electrode group 223R of − phase and the fourth external electrode group 224R of + phase as a pair, the fifth external electrode group 225R of + phase and the sixth external electrode group 226R of − phase as a pair, and the seventh external electrode group 227R of − phase and the eighth external electrode group 228R of + phase as a pair, respectively, compose the four pairs of phases on the rear surface 220R of the multilayered piezoelectric element 220.

From another aspect, the multilayered piezoelectric element 220 consists of four regions 220A, 2203, 220C, and 220D with an angle of 90 degrees for each, separated by orthogonal surfaces around a central axis 200c (FIGS. 13A, 13B, 14A, and 14B).

The region 220A corresponds to the pairs of the third external electrode group 223F of − phase and the fourth external electrode group 224F of + phase, and the pairs of the seventh external electrode group 227F of − phase and the eighth external electrode group 228F of + phase. The region 220B corresponds to the pairs of the third external electrode group 223R of − phase and the fourth external electrode group 224R of + phase, and the pairs of the seventh external electrode group 227R of − phase and the eighth external electrode group 228R of + phase. The region 220C corresponds to the pairs of the first external electrode group 221F of + phase and the second external electrode group 222F of − phase, and the pairs of the fifth external electrode group 225F of + phase and the sixth external electrode group 226F of − phase. The region 220D corresponds to the pairs of the first external electrode group 221R of + phase and the second external electrode group 222R of − phase, and the pairs of the fifth external electrode group 225R of + phase and the sixth external electrode group 226R of − phase.

By this structure, each part is deformed reacting to a signal when the signal is applied to each phase from the external power supply. Since each region includes two pairs of phases, a part corresponding to each phase can be deformed to different directions even in the same region.

Figure 15:
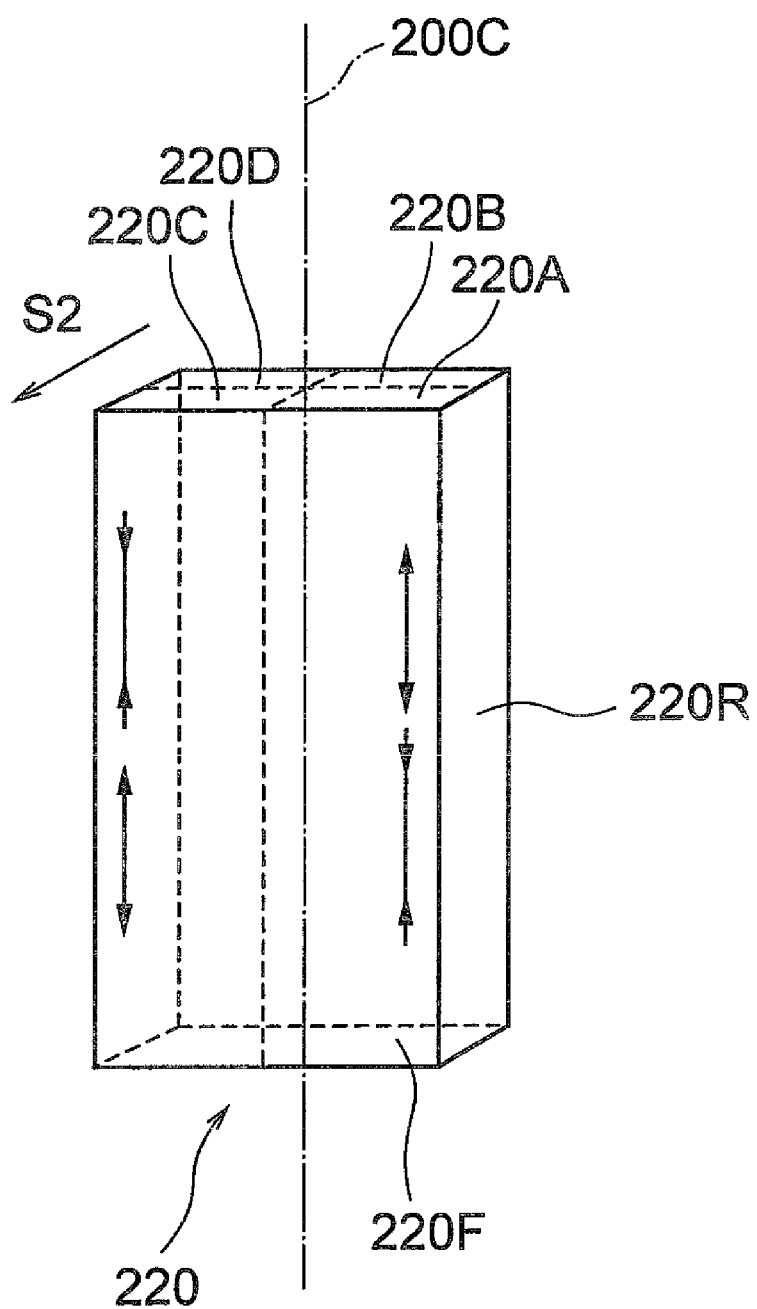
FIG. 15 is a perspective view from the upper front side of the multilayered piezoelectric element of the second embodiment that shows a deformation in each area of the multilayered piezoelectric element.
Figures 16A, 16B, 16C, 16D:
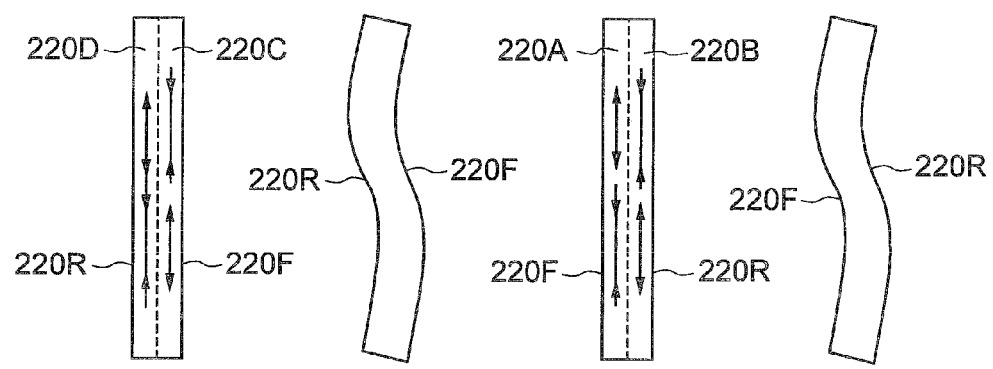
FIG. 16A is a left side view of the multilayered piezoelectric element shown in FIG. 15.
FIG. 16B is a left side view of the deformation of the multilayered piezoelectric element shown in FIG. 15.
FIG. 16C is a right side view of the multilayered piezoelectric element shown in FIG. 15.
FIG. 16D is a right side view of the deformation of the multilayered piezoelectric element shown in FIG. 15.

An operation of the vibrator 101 and the multilayered piezoelectric element 220 is explained below referring to FIG. 15 and FIGS. 16A to 16D. FIG. 15 shows deformations of each region of the multilayered piezoelectric element 220 and it is a view from the upper front side. FIG. 16A is a left side view of the multilayered piezoelectric element 220 shown in FIG. 15. FIG. 16B is a left side view of the deformation of the multilayered piezoelectric element 220 shown in FIG. 15. FIG. 16C is a right side view of the multilayered piezoelectric element 220 shown in FIG. 15. FIG. 16D is a right side view of the deformation of the multilayered piezoelectric element 220 shown in FIG. 15. The external power supply is not shown in FIG. 15 and FIGS. 16A to 16D.

In the examples shown in FIG. 15 and FIGS. 16A to 16D, a signal is respectively applied to the pairs of the external electrode groups of each region from the external power supply. As the effect, in the region 220A, the deformation occurs so that, a section facing to the third external electrode group 223F and the fourth external electrode group 224F expands to a direction along the central axis 200c, and a portion facing to the seventh external electrode group 227F and the eighth external electrode group 228F contracts to the direction along the central axis 200c. Likewise, in the region 220B, deformation occurs so that, a section facing to the fifth external electrode group 223R and the sixth external electrode group 224R contracts to the direction along the central axis 200c, and a section facing to the seventh external electrode group 227R and the eighth external electrode group 228R expands to the direction along the central axis 200c.

Moreover, in the region 220C, deformation occurs so that, a section facing to the first external electrode group 221F and the second external electrode group 222F contracts to the direction along the central axis 200c, and a section facing to the fifth external electrode group 225F and the sixth external electrode group 226F expands to the direction along the central axis 200c. Likewise, in the region 220D, deformation occurs so that, a section facing to the first external electrode group 221R and the second external electrode group 222R expands to the direction along the central axis 200c, and a section facing to the fifth external electrode group 225R and the sixth external electrode group 226R contracts to the direction along the central axis 200c.

Accordingly, the multilayered piezoelectric element 220 deforms to the direction along the central axis 200c so that the adjacent regions or the adjacent portions deform to opposite directions and the directions of deformations are along a direction of polarization (direction S2 of stacking). Meanwhile, the directions of deformations of each region can differ from those shown in FIG. 15 and FIGS. 16A to 16D as far as the directions of deformations of the adjacent regions are opposite.

As explained above, by deforming the four regions, the elliptical vibration is generated on both surfaces of the height direction of the vibrator 101 by combining the longitudinal primary resonance vibration (FIG. 3C) and the torsional tertiary resonance vibration (FIG. 3E) around the central axis 200c as an axis of twisting. Accordingly, the elliptical vibration is transmitted to the rotor 102 through the friction contact members 103a and 103b. Likewise, the torsional tertiary vibration to an opposite direction can be generated by applying a signal so that each portion of each region will deform to the opposite direction.

With the structure mentioned above, the vibrator 101 that consists of a single part of a simple structure without a groove etc., can be obtained. The cost of the ultrasonic motor 100 that includes this vibrator 101 can be reduced because it requires only a small number of parts and can be easily assembled. Furthermore, the ultrasonic motor 100 can easily generate the longitudinal vibration and the torsional vibration, and rotate the rotor 102 using the elliptical vibration by combining these vibrations. Furthermore, other structures, operations, and advantages are the same as those of the first embodiment.

As explained above, the ultrasonic motor according to the present invention is appropriate for the ultrasonic motor that rotates the rotor by generating the elliptical vibration by combining the longitudinal vibration and the torsional vibration.

The ultrasonic motor according to the present invention can generate the torsional resonance vibration efficiently by positively applying the longitudinal vibration of the piezoelectric element. Moreover, the ultrasonic motor according to the present invention consists of a single part, has a simple structure without a groove etc., can generate the longitudinal vibration and the torsional vibration easily, can generate the elliptical vibration by combining the longitudinal vibration and the torsional vibration, and can rotate the rotor by the elliptical vibration.

What is claimed is:

1. An ultrasonic motor comprising:
    a vibrator having a dimension ratio of a rectangle in a cross-section orthogonal to a central axis; and
    a rotor that contacts an elliptical vibration generating surface of the vibrator and that is rotation driven around the central axis that is orthogonal to the elliptical vibration generating surface of the vibrator, wherein
    an elliptical vibration is generated by combining a longitudinal primary resonance vibration resulting from an expansion and a contraction of the vibrator in a direction of the central axis and a torsional secondary resonance vibration or a torsional tertiary resonance vibration resulting from twisting around the central axis,
    the dimension ratio of the rectangle of the vibrator is chosen such that a resonance frequency of the longitudinal primary resonance vibration and a resonance frequency of the torsional secondary resonance vibration or the torsional tertiary resonance vibration match,
    the vibrator includes a plurality of regions in a surface orthogonal to the central axis,
    deformations of the regions adjacent to each other along the direction of the central axis are mutually different in the regions, and
    the vibrator expands and contracts in a direction along a polarization direction thereof.

2. The ultrasonic motor according to claim 1, wherein each of the regions among the regions is deformed in a single direction to generate the torsional secondary resonance vibration resulting from twisting around the central axis.

3. The ultrasonic motor according to claim 1, wherein each of the regions among the regions is deformed in a mutually different direction to generate the torsional tertiary resonance vibration resulting from twisting around the central axis.

* * * * *